US012406559B2

(12) United States Patent
Speagle et al.

(10) Patent No.: US 12,406,559 B2
(45) Date of Patent: Sep. 2, 2025

(54) THEFT MONITORING AND IDENTIFICATION SYSTEM FOR SELF-SERVICE POINT OF SALE (71) Applicant: USConnect, LLC, Greensboro, NC (US)

(72) Inventors: Michael A. Speagle, Hickory, NC (US); Mark Miller, San Diego, CA (US); Kevin Galaida, Lakewood, OH (US); Benjamin Lee Valle, Newton, NC (US)

(73) Assignee: USConnect, LLC, Greensboro, NC (US)

( * ) Notice: Subject to any disclaimer, the term of this patent is extended or adjusted under 35 U.S.C. 154(b) by 0 days.

(21) Appl. No.: 16/836,091

(22) Filed: Mar. 31, 2020

(65) Prior Publication Data
US 2020/0349820 A1 Nov. 5, 2020

Related U.S. Application Data (60) Provisional application No. 62/833,660, filed on Apr. 13, 2019.

(51) Int. Cl.
G08B 13/196 (2006.01)
G06Q 20/18 (2012.01)
(Continued)

(52) U.S. Cl.
CPC ....... *G08B 13/19613* (2013.01); *G06Q 20/18* (2013.01); *G06V 20/40* (2022.01);
(Continued)

(58) Field of Classification Search
CPC ............ G08B 13/19613; G06Q 20/18; G06K 9/00711; G06K 9/00771; G06K 9/00335; G06K 2209/27
See application file for complete search history.

(56) References Cited

U.S. PATENT DOCUMENTS 7,389,918 B2  6/2008  Wike, Jr. et al.
7,620,568 B1  11/2009  Parker-MalChak
(Continued)

FOREIGN PATENT DOCUMENTS

CA    3136497      10/2020
WO    2023076834    5/2023
WO    2023147225    8/2023

*Primary Examiner* — Amara Abdi
(74) *Attorney, Agent, or Firm* — Womble Bond Dickinson (US) LLP (57) ABSTRACT In an embodiment, the invention provides a theft-monitoring system having one or more cameras, a data store, and a computer processor coupled to the data store and in communication through a network via a web interface with a video reviewer's computing device. The data store includes records that each include collected footage from the cameras and screen or metadata recordings. The processor is programmed, upon receiving an indication of entry of potential purchaser, to track suspicious behavior of the potential purchaser and store data representing screen, video and metadata associated therewith in the data store. The processor determines if the suspicious behavior warrants evaluation, collects relevant data based on the data stored in said data store and, in response to a determination of suspicious activity, transmits the relevant data over a network for review by an operator.

26 Claims, 6 Drawing Sheets (51) Int. Cl.
   *G06V 20/40* (2022.01)
   *G06V 20/52* (2022.01)
   *G06V 40/20* (2022.01)
(52) U.S. Cl.
   CPC .............. *G06V 20/52* (2022.01); *G06V 40/20* (2022.01); *G06V 2201/10* (2022.01)

(56) References Cited

U.S. PATENT DOCUMENTS

| | | | |
|---|---|---|---|
| 7,631,808 B2 * | 12/2009 | Kundu | G06T 7/00 235/383 |
| 8,104,680 B2 * | 1/2012 | Kundu | G06Q 20/00 235/383 |
| 8,181,865 B2 | 5/2012 | Daily | |
| 8,328,096 B2 | 12/2012 | Daily | |
| 8,332,502 B1 * | 12/2012 | Neuhaus | H04L 41/0686 709/224 |
| 8,538,820 B1 * | 9/2013 | Migdal | G07G 1/0054 705/16 |
| 8,570,375 B1 | 10/2013 | Srinivasan et al. | |
| 8,874,471 B2 | 10/2014 | Argue et al. | |
| 9,473,747 B2 | 10/2016 | Kobres et al. | |
| 9,564,031 B2 | 2/2017 | Migdal et al. | |
| 10,083,430 B2 | 9/2018 | Hay | |
| 10,192,208 B1 * | 1/2019 | Catoe | G07G 1/0054 |
| 10,417,891 B2 | 9/2019 | Caution et al. | |
| 10,990,945 B2 | 4/2021 | Bengtsson et al. | |
| 11,100,333 B2 | 8/2021 | Kundu et al. | |
| 11,113,937 B2 | 9/2021 | Carey | |
| 11,482,082 B2 | 10/2022 | Farrow et al. | |
| 11,599,891 B2 | 3/2023 | Budano et al. | |
| 2010/0095208 A1 * | 4/2010 | White | H04L 67/535 715/704 |
| 2012/0127316 A1 * | 5/2012 | Kundu | G06Q 20/00 348/150 |
| 2014/0132728 A1 * | 5/2014 | Verano | G06V 20/52 348/46 |
| 2014/0316916 A1 * | 10/2014 | Hay | G06Q 20/20 705/17 |
| 2015/0187080 A1 * | 7/2015 | Kundu | G07G 1/0036 382/103 |
| 2015/0269549 A1 | 9/2015 | Herring et al. | |
| 2016/0093184 A1 * | 3/2016 | Locke | H04N 7/183 348/143 |
| 2016/0275518 A1 * | 9/2016 | Bowles | G06V 40/166 |
| 2018/0096567 A1 * | 4/2018 | Farrow | G06V 20/41 |
| 2018/0191653 A1 * | 7/2018 | Aggarwal | H04N 21/4312 |
| 2018/0232796 A1 * | 8/2018 | Glaser | G06Q 90/20 |
| 2018/0300557 A1 * | 10/2018 | Rodenas | G08B 13/19613 |
| 2023/0087587 A1 | 3/2023 | Yang et al. | |
| 2023/0106047 A1 | 4/2023 | Saarloos et al. | |
| 2024/0029441 A1 | 1/2024 | Jeon et al. | |

* cited by examiner

THEFT MONITORING AND IDENTIFICATION SYSTEM FOR SELF-SERVICE POINT OF SALE

This application is a non-provisional of and claims priority from U.S. Patent Application Ser. No. 62/833,660, filed Apr. 13, 2019, which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present invention relates in general to the field of surveillance in unattended retail environments, and in particular to a novel theft monitoring and identification system.

BACKGROUND

In recent years, small marketplaces have appeared in workspaces to provide retail items such as food, beverages and other items to employees. These retail markets, which are often referred to by the trade name "micro markets," typically include a self-checkout kiosk or point of sale (POS) system. Such POS systems are usually unattended, and employees are often trusted to pay appropriately for the goods they take.

Occasionally a micro market operator will monitor the markets with traditional security camera systems. However, traditional camera systems continuously record, leaving a long video for tedious review to find suspicious activity or theft, which may only account for a few minutes out of hours of footage. Remote management of the traditional security camera systems can be challenging due networking issues. When theft is discovered, operators must export large video files to communicate with outside parties responsible for addressing the issue with the employee suspected of stealing. Due to these technical challenges and the time and manual effort required to manage the process, theft often goes undetected, resulting in significant financial losses for operators.

Based on the foregoing, there is a potential need in the art for a system which can optimize efficiency by automatically identifying potentially suspicious behavior or theft in an unattended marketplace, thus minimizing the effort required to review and extract relevant video footage. What may be further desired is a system which allows for the storage of the video, along with detailed notes, descriptions, supporting documentation about the events, in a way that allows for easy and efficient sharing of evidence of theft for review, improving the process of communicating about incidents of theft with the relevant parties.

SUMMARY

In an embodiment, the invention provides a security-monitoring camera system that is configured to monitor activity at an unattended self-service point-of-sale and to send relevant and highly targeted video clips, screen shots of a customer-facing screen, and/or other associated metadata (such as timestamps, detected information about participants, or other associated data and satisfied conditions for suspicious behavior) over a network when a threshold suspicion score has been reached. In this respect, the camera may be installed at a customer's facility and operate over a cellular data network with reduced bandwidth without utilizing the customer's data network.

In an embodiment, the invention provides a security-monitoring camera system that uses LIDAR to sense the presence of persons close to shelves containing items for sale and uses that information to search video taken by one or more cameras monitoring the shelves.

In an embodiment, the invention provides a security-monitoring camera system that uses Phone, Bluetooth MAC Tracking Number Correlation with known transactions that are theft to search for new potential theft.

In an embodiment, the invention provides a security-monitoring camera system that provides load cells to sense removal of items from a shelf or cooler and uses that in combination with other data (such as LIDAR data) to identify potential theft.

In an embodiment, the invention provides a security-monitoring camera system that is configured to regularly store still images of the inventory of sales items on shelves and to monitor stock levels so as to improve service schedules.

In an embodiment, the invention provides a security-monitoring camera system that is configured to track and utilize theft repeat offenders, including total theft dollar amounts associated with an offender's suspected thefts.

In an embodiment, the invention provides a security-monitoring camera system that is configured to interface with multiple manufacturers' point-of-sale systems.

The invention in accordance with an embodiment provides a self-service kiosk that includes a customer-facing display screen, a screen recorder, one or more cameras, a network, and an application server. The screen recorder is configured to capture images of the screen of the self-service kiosk. The cameras are configured to monitor an area around the self-service kiosk. The network is configured to communicate images and video captured by the screen recorder and the one or more cameras. The application server is configured to receive, store, and process the images and video captured by the screen recorded. The application server is further configured to assign each transaction a suspicion score and generate an alert when the suspicion score reaches a predetermined threshold.

In a direct kiosk integration embodiment, the system is configured to monitor activity without recording the kiosk screen, by instead relying on raw transaction data. In such embodiments, the system can be configured to store data sufficient to reconstruct the customer-facing kiosk screen.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices to provide a theft monitoring and identification system. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
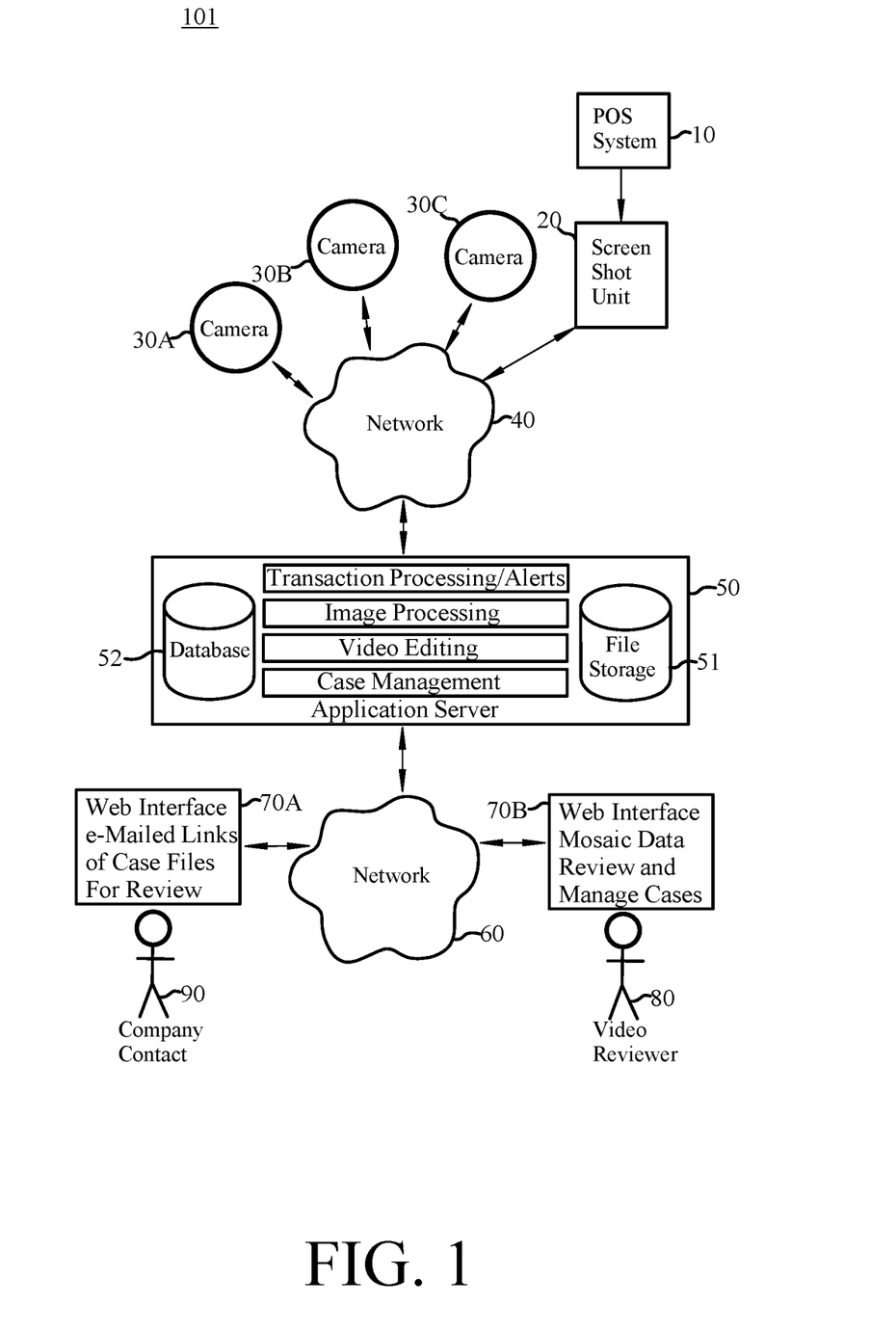
FIG. 1 is a depiction of the theft monitoring and identification system, according to an embodiment.

With reference to FIG. 1, a system 101 for use with a point-of-sale (POS) system 10 is provided. In an embodiment, the POS system is unattended, but in other embodiments the teachings herein may be applied to an attended POS system, or a POS system that is configured to be used in an attended mode or an attended mode. In an example the POS system 10 is provided as a kiosk for self-service and checkout. Self-service POS systems are known and may include features such as card readers, cash intake, change dispensers, touchscreen controls, a weight scale, receipt printer, bag holder, etc. In an example, multiple POS systems may be provided in a single market, and each POS system may be connected to the theft monitoring and identification system provided herein. In an embodiment, the problem to be solved is bandwidth limitations over cellular data networks.

In an embodiment, the self-service POS system 10 is provided with screen recording software or a screen recording unit 20 to record the customer-facing screen of the POS system as a customer purchases items. In an example utilizing a screen recording unit, the unit is connected to the POS system through a Video Graphics Array (VGA) connection, a High-Definition Multimedia Interface (HDMI) connection, Digital Visual Interface (DVI) connection, Radio-Frequency coaxial connection (RCA), or other known display interface connection types. In another embodiment, the screen recording system may use a wireless interface to broadcast the images of the screen of the POS system to a remote screen recording unit. The system in an embodiment is configured to capture, store and display data representing the self-checkout customer-facing screen. There is great value in capturing this information, including making it much easier for an HR manager or similar individual at a customer account to understand what the customer accused of theft saw on the screen and how they interacted with the self-checkout market.

In an example, the customer transaction at the POS system 10 is monitored by at least one of a plurality of cameras 30A, 30B and 30C (collectively, "cameras 30"). In an embodiment, multiple cameras 30 are provided to monitor various angles the POS system and/or other locations within or in the vicinity of the market. One of the cameras may be located on the kiosk and pointed at the user who is processing the current transaction. In an example, the cameras can store the footage they record locally as backup, along with transmission of such footage to a separate data store.

In an embodiment, the screen recording unit 20 and the cameras 30 are connected via network 40. The network 40 may be provided as a local area network (LAN), wireless area network (WAN), cellular data network, or another suitable network type. The connection to the network may be achieved through wired or wireless communication, including, but not limited to, ethernet, cellular, wireless adapter, or fiber optic, for example.

In an embodiment, the network 40 uploads the footage, including screen records and metadata, to the application server 50. The server stores collected footage and screen recordings in file storage system 51 and metadata in database 52. The file storage and database can be considered as cloud storage on the application server.

Upon receiving the footage, screen recordings and metadata from the network 40 of cameras and screen recording units, the application server analyzes and process the received footage and data. As part of the processing, the server analyzes transactions which occurred at the self-service POS system 10 for any suspicious activity.

In an embodiment, upon analyzing the provided data and recordings, application server 50 processes the transaction data and assigns a suspicion score to each transaction. Suspicious activities can relate to voided transactions, removed items, declined payment methods, and other transaction activities which incur some level of suspicion. If a transaction is assigned a suspicion level above a set or predetermined threshold, then related footage and screen records will be gathered and processed by the application server.

In an embodiment, upon determining that a transaction meets a suspicion level above a predetermined threshold, the footage recorded by the cameras 30 and screen recording units 20 will be gathered for an elapsed time prior to, during, and after the suspicious transaction. All gathered data relating to the suspicious transaction will be compiled and a case will be created for the suspicious transaction. The case may include the various footage and metadata, for example, and may also include references to related information available within the system.

In an embodiment, the compiled data for a suspicious transaction case will be sent by the application server 50 to a review network 60. The review network 60 may be provided as a local area network (LAN), wireless area network (WAN), cellular data network, or another suitable network type. The connection to the network may be achieved through wired or wireless communication, including, but not limited to, ethernet, cellular, wireless adapter, or fiber optic, for example.

In an embodiment, a video reviewer 80 can access the compiled cases of suspicious transactions. In an example, the compiled cases may be presented to the reviewer 80 as a web interface 70A and 70B (collectively, "web interface 70"). The web interface for each case may contain a mosaic of the compiled footage and screen recordings related to the suspicious transaction. The reviewer is able to analyze the data by viewing a specific recording, zooming in, pausing, slowing down footage, etc. If the reviewer 80 determines that the case of a suspicious transactions warrants further review or action, the reviewer can then notify an employer or company official 90 via the review network 60 to request that the official review the case.

In an example, a company contact, manager, official, or employer 90 will have direct access to the cases deemed suspicious via the review network 60. The manager 90 will also have access to the web interface 70 if they wish to review the case further. In an embodiment, the manager 90 will also be able to receive notifications flagged by a video reviewer 80, when said reviewer indicates the cases of suspicious transactions require further review.

Figure 2:
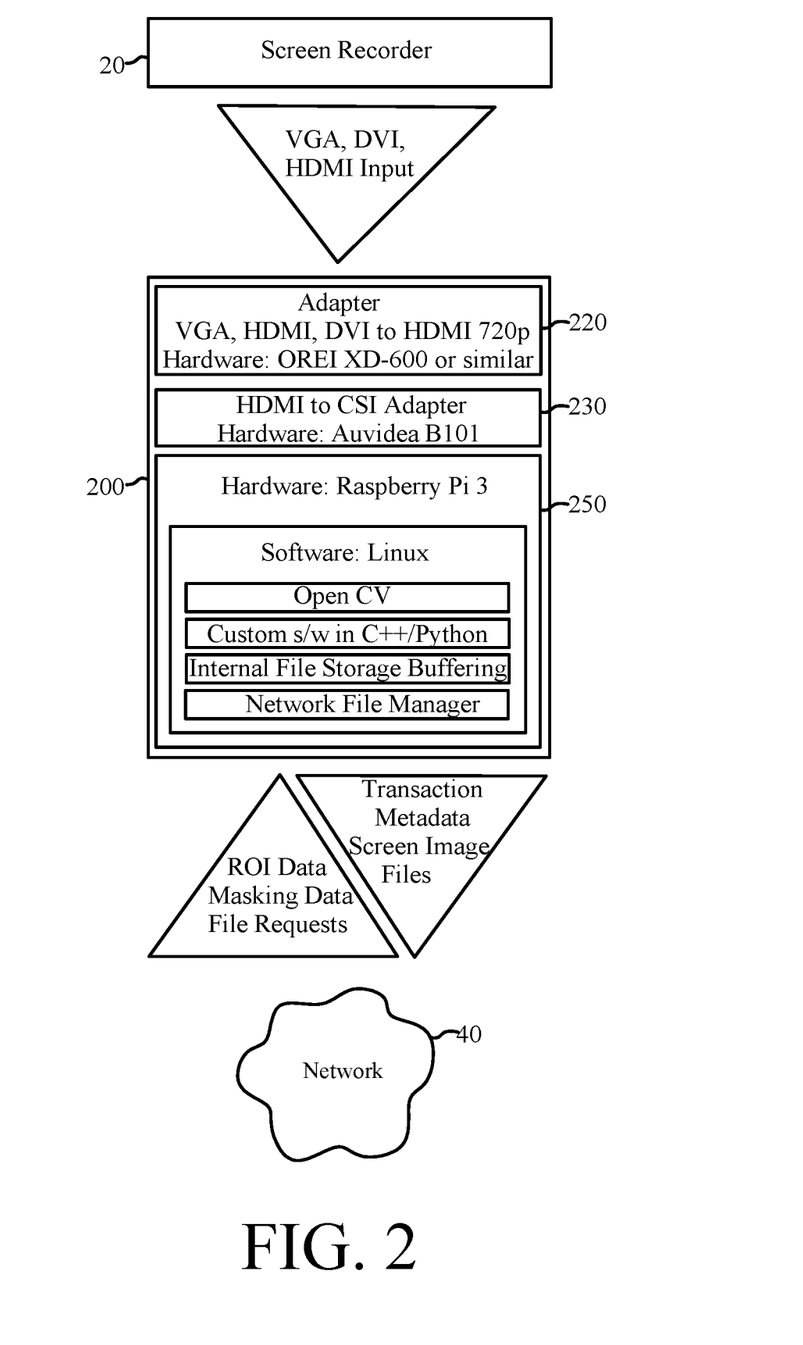
FIG. 2 is a block diagram depicting an example connection of a recording device to a network, according to an embodiment.

With reference to FIG. 2, a block diagram depicts an example wherein a screen recording device 20 is connected to a network 40 via computing system 200, such that the images, recordings and data captured by the screen recording device can be uploaded to an application server. In the example, the screen recording device is connected to a computing device 250. Said computing device is may preferably be small, affordable and able to connect to at network as an internet of things (IoT) device. In a specific example, a Raspberry Pi 3 may be used as the computing device 250.

In an embodiment, the screen recorder 20 is connected to video adapter 220 via VGA, DVI, HDMI or another suitable connection method. In a specific example, the video adapter is a VGA to HDMI adapter, such as an Orei Xd-600. A camera serial interface (CSI) adapter 230 provides a compatible connection from the video adapter 220 to the computing device 250. In a specific example, the CSI adapter is a CSI-2 adapter, such as an Auvidea B101 HDMI to CSI-2 bridge. In an example, the computing device 250 incorporates a Linux operating system (OS) to utilize Open Source Computer Vision Library (OpenCV) programming functions in addition to custom programming written C++ and/or Python. Further examples may include the use of Java or other suitable programming languages. The computing device further includes internal file storage buffering to handle data and images coming from the screen recorder 20 prior to passing said data and images to the network 40. The computing device also includes a network file manager for organization of metadata and images.

The computing system 200 facilitates the transfer of transaction metadata and screen recordings from the screen recording unit 20 to the network 40. The computing system also handles file requests, Return on Investment (ROI) data, and data masking coming from the network.

In a direct kiosk integration embodiment, the system is configured to monitor activity without recording the kiosk screen, by instead relying on raw transaction data. In such embodiments, the system can be configured to store data sufficient to reconstruct the customer-facing kiosk screen.

Figure 3:
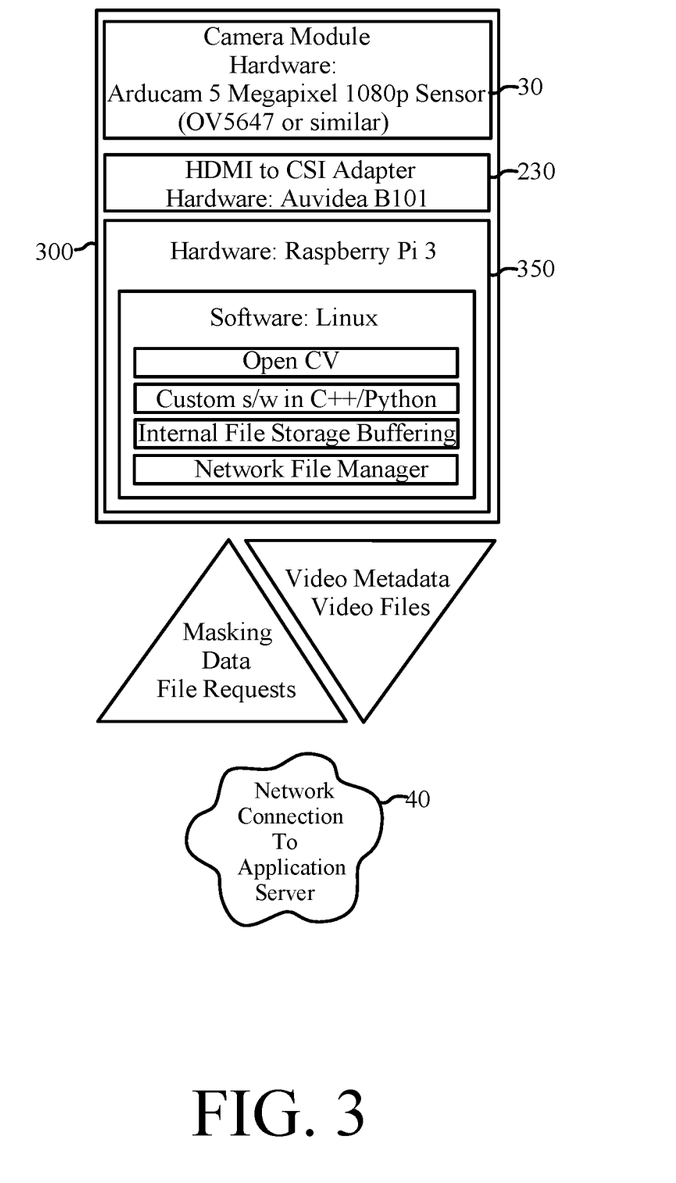
FIG. 3 is a block diagram depicting an example connection of a recording device to a network, according to an embodiment.

With reference to FIG. 3, a block diagram depicts an example wherein a camera system 300 is connected to a network 40 such that the images, recordings and data captured by a camera 30A can be uploaded to an application server. In a specific example, an Arducam 5 megapixel, 1080p sensor or similar camera module may be used. The camera 30 is connected to a computing device 350 to form the camera system 300 which is capable of sending data and taking requests to and from the network 40. Said computing device is preferable small, affordable and able to connect to at network as an internet of things (IoT) device. In a specific example, a Raspberry Pi 3 may be used as the computing device 350.

In an example, the computing device 350 incorporates a Linux operating system (OS) to utilize Open Source Computer Vision Library (OpenCV) programming functions in addition to custom programming written C++ and/or Python. Further examples may include the use of Java or other suitable programming languages. The computing device further includes internal file storage buffering to handle data and videos coming from the camera 30 prior to passing said data and video to the network 40. The computing device also includes a network file manager for organization of metadata and images.

In an example, a transaction in which the first attempt at payment is declined might have one suspicion point added to the suspicion score of the transaction and the removal of an item from the transaction might add two suspicion points to the suspicion score. In an example, if the threshold for a suspicious activity is set at three, then the removal of an item alone will not be enough to mark a transaction as a suspicious transaction. However, both the removal of an item and a declined payment attempt would be enough to mark the transaction as suspicious. This example is submitted for clarification of the theft detection system only and should not be considered as limiting. In embodiments, a multitude of activities can be used to add to a total suspicion score and the threshold for a suspicious transaction can be customized to meet the time constraints, needs, or requirements for a particular market in which self-service transaction kiosks are presents. Moreover, suspicion criteria may include other considerations, such as time of day, presence of other individuals, patterns of activity, or other factors which may be monitored automatically, for example.

In an example, when a case of suspected theft is detected by the system, the recorded videos, images, and associated metadata are edited such that the case provided to the user reflects only the associated transaction. This may include clipping video from the cameras such that the reviewer only has to review images and video just prior to, during, and just after the suspicious transaction. Thus, saving the reviewer valuable time. The automated detection of suspicious activity will also potentially save the company running the marketplace valuable time and therefore money. For example, using techniques described herein with an embodiment of a system such as the system described herein, review throughput has been found to decrease by a factor of about thirty, with one example situation resulting in reviews that previously required approximately thirty minutes coming to completion in approximately one minute with the embodiments of techniques and system as described.

In embodiments, the cameras can utilize facial recognition technology. In an example, the facial expressions of a user at the self-service kiosk may be tracked. Certain facial expressions, related to suspicious behavior, may result in additions to a total suspicion score. In another example, facial recognition technology can be used to identify a user across multiple suspicious transactions. The data collected during the multiple suspicious transactions completed by a recognized user can then be compiled into a single case for review.

In an embodiment, cameras can utilize motion tracking technology. In an example, the system will analyze the video to determine and track a user's movements prior to, during, and after the suspicious transaction. The tracked user in question, may be highlighted in the video such that a reviewer can better monitor their movements around the marketplace before, after, and during the suspicious transaction. Additionally, suspicious behavior before or after a transaction may be used to determine whether a threshold for review has been met, for example.

In an embodiment, the application server is configured to make use of available machine learning and neural network technology to better analyze and process data, videos, and images associated with transactions to determine a level of suspicion. Software such as Google Optical Character Recognition (OCR), Google Machine Learning, and third-party neural network training sets can be utilized such that the automated detection of a suspicious activity related to theft is improved within the system. Furthermore, feedback provided as the reviewers confirm that the suspicious activities detected are indeed theft or not can help improve the system.

Figure 4:
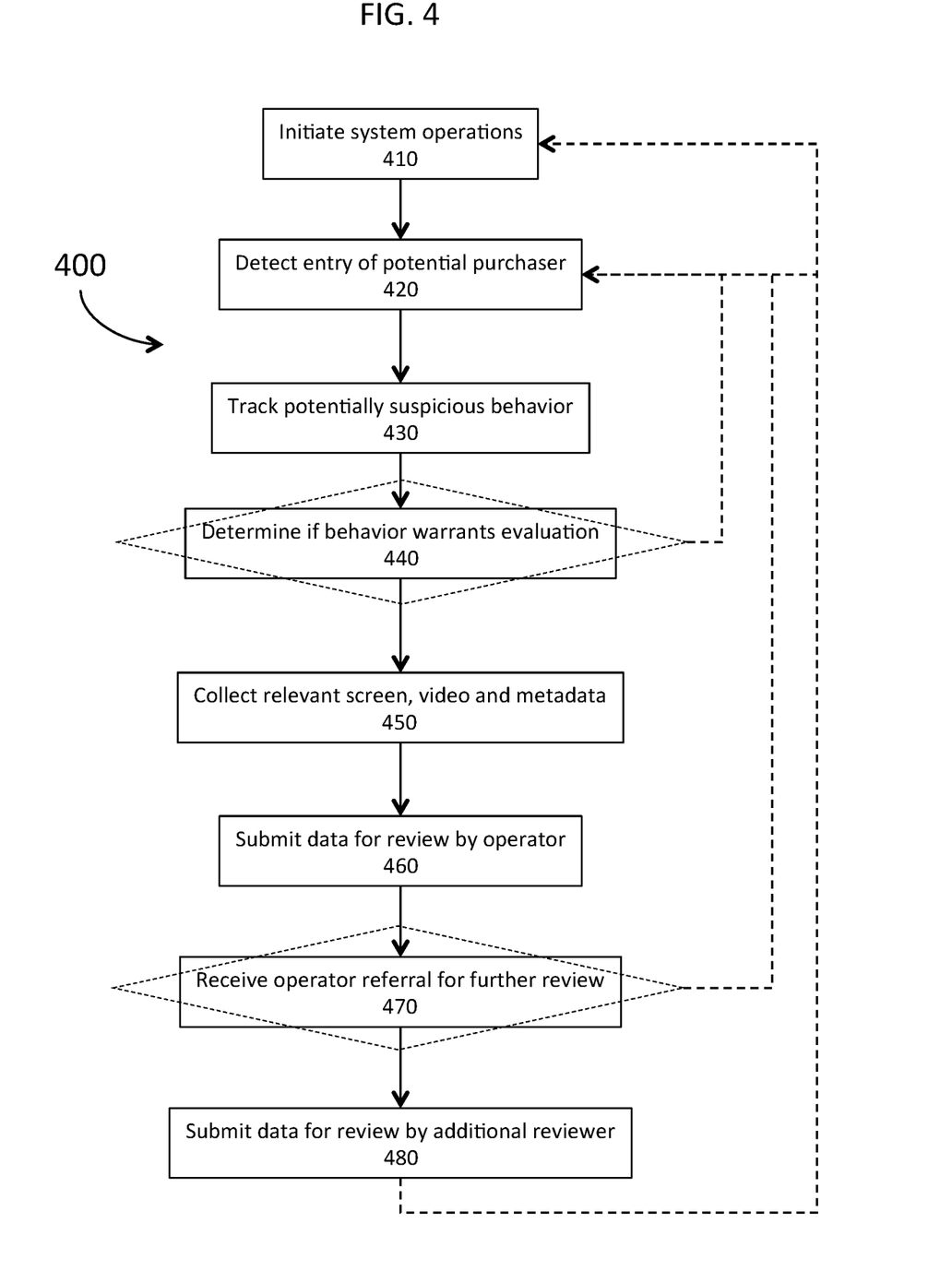
FIG. 4 is a block diagram depicting an example process of evaluating transactions, according to an embodiment.

In an embodiment, the process implemented by embodiments of hardware described above and illustrated herein may take many different forms. Process 400 provides an example of such a process, presented as a series of modules. Process 400 is presented in a linear or step-wise fashion, but variations of such a process may be considered with parallel or simultaneous execution of parts of the process, for example. Moreover, variations of the process may include performing only some of the modules or repeating one or more modules in various situations.

Process 400 starts with initiation of system operations of a system such as an embodiment similar to or identical to that described above at module 410. At module 420, entry of a potential purchaser into a monitored area is detected. At module 430, the system tracks activity of the potential purchaser, collecting indications of suspicious behavior, for example.

The system determines if suspicious behavior warrants building of a case or case file, for example, at module 440. Module 440 may be a decision module, permitting the system to dispense with the rest of the process when suspicious behavior has not been detected. Additionally, module 440 may include totaling up points associated with behavior, for example, or meeting other conditions, such as multiple forms of suspicious behavior, for example.

With suspicious behavior found, the system builds up a case at module 450, collecting relevant video clips, screen shots, and any other associated metadata such as timestamps, detected information about participants, or other associated data and satisfied conditions for suspicious behavior. The system then submits the data at module 460, allowing for review of the case from module 450 by an operator of the system. If the operator reviews the data and determines there is a need for further review, the operators provides a referral or approval for further review at module 470. An operator may decline further review as well, thus ending the process or restarting it prior to module 470. At module 480, data is submitted from the case file for further review, which may occur through review by an employer or operator of a market, for example.

Additionally, the system continues monitoring activity by returning to module 410 or 420, for example. Thus, the process may be instantiated multiple times or may operate modules in simultaneous operation to maintain data about multiple users of a marketplace, for example. An employer or marketplace operator may use this process to detect problem transactions or problem users and may then deal with the situation as necessary.

Figure 5:
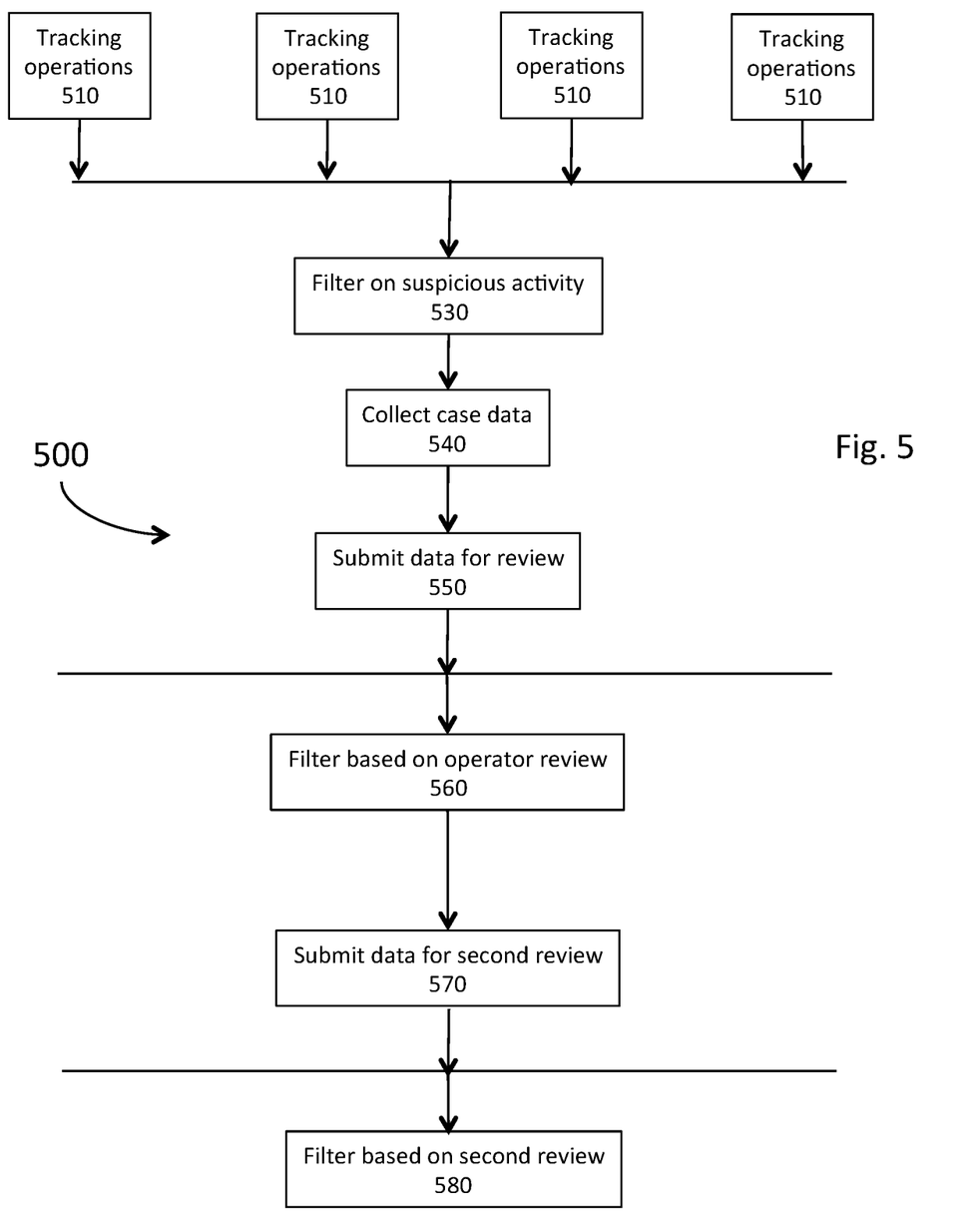
FIG. 5 is a block diagram depicting an alternative example process of evaluating transactions, according to an embodiment.
Figure 6:
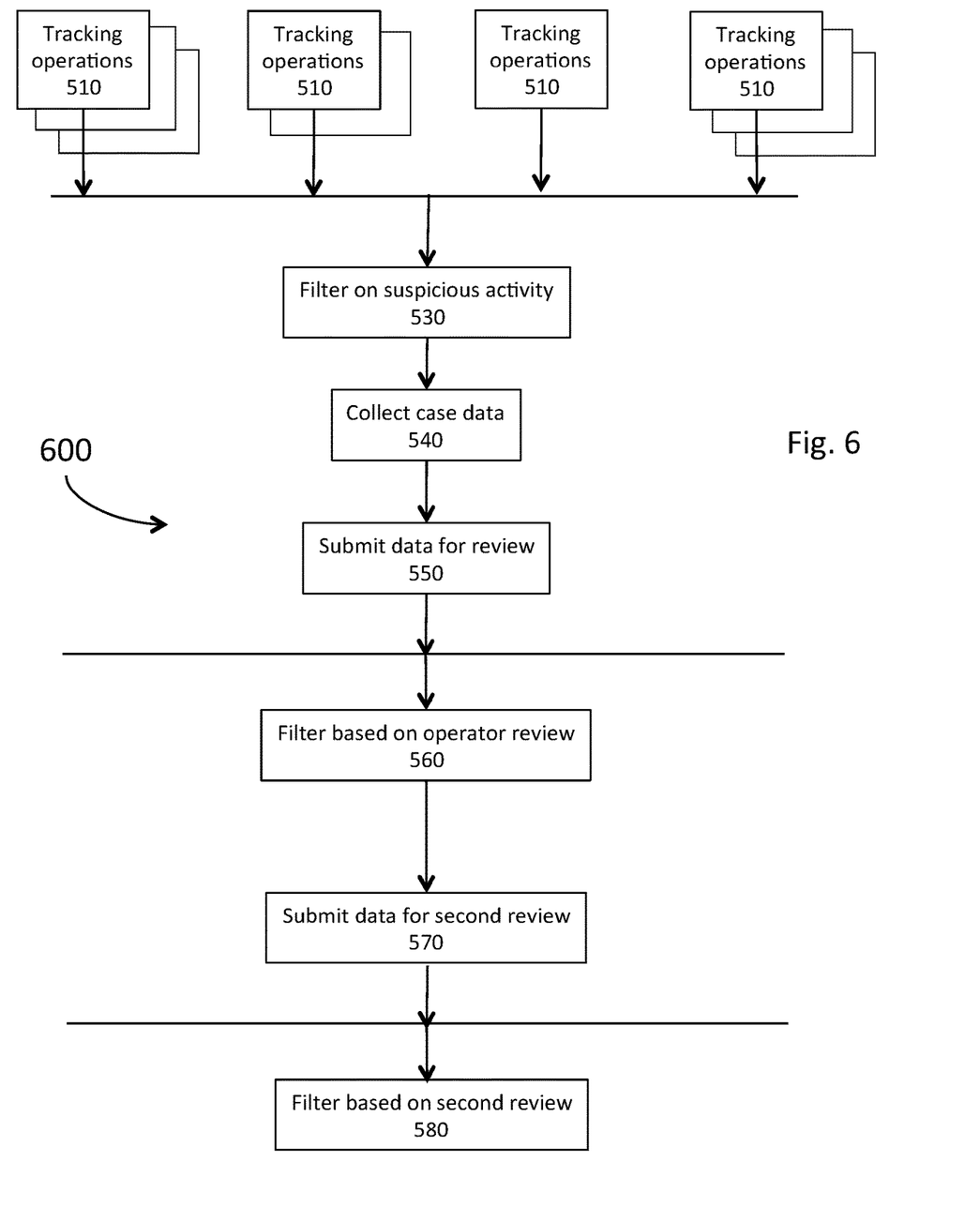
FIG. 6 is another block diagram depicting another example process of evaluating transactions, according to an embodiment.

FIGS. 5 and 6 provide two similar processes which are based on process 400 of FIG. 4, and may be implemented in a step-wise or linear fashion, or in a fashion involving parallel execution, for example. Process 500 of FIG. 5 illustrates that tracking of transactions at module 510 occurs for a variety of transactions. The system implementing the process reviews those transactions from module 510 to determine suspicious behavior at module 530. For some systems, relatively low cost imposes constraints on processing power, availability of cameras and other resources. Thus, a system may implement the process with a single Raspberry Pi device, for example, and may only track specific transactions at the time of sale. Such a system would then select events based on filtering of module 530, and at module 540 would collect stored data such as video data in memory or a buffer, stored screenshots and similar data for a transaction based on the time of the transaction. The data collected at module 540 is submitted for review by a human operator or an expert system, for example, at module 550.

Based on operator review, at module 560, data is filtered responsive to selections made by a reviewing operator. Data selected by the reviewer is submitted for a second review at module 570, and data not selected by the reviewer may either be stored for further consideration or removed from the system in various embodiments. At module 580, data is filtered based on the second review, such as by an employee of the company hosting a marketplace or by other evaluators, and data selected for further action may be used in discussions with the subject of a transaction, for example.

FIG. 6 and process 600 provide an alternative embodiment. Tracking modules 510 may be implemented in a more parallel fashion, identifying potential purchasers when they arrive and using facial recognition to track activity prior to and after a transaction. Thus, suspicious behavior may be captured in a broader window of time, before and after an actual transaction at a POS terminal, for example. Moreover, this provides an opportunity to catch behavior which does not result in a transaction, such as a person entering a marketplace area and leaving without any purchase, but appearing to leave with items that should have been purchased.

Implementing a process such as process 600 may be expected to require greater resources in terms of computing power. Such a system may be implemented in a system using multiple processors, such as by systems available from Dell Computer, Asus, Acer, or other providers of devices. Moreover, such a system may require additional surveillance assets in some embodiments. In other embodiments, simply accessing video data in a shared storage location may be sufficient to allow for tracking of multiple interactions in an essentially simultaneous fashion. Such a system may thus require greater expense, but allow for more sophisticated analysis.

Each of these embodiments may also be tuned for other considerations. Thus, one may tune an embodiment for a higher level of suspicious activity or combination of suspicious activity to trigger review in instances where marketplaces are not losing substantial revenue. Alternatively, further scrutiny may be devoted to marketplaces where revenue is either falling or revenue does not seem to match consumption of goods. Additionally, the types of suspicious activity may be predetermined for analysis based on a combination of training based on previous events and interventions by a human operator, for example.

In an embodiment, the theft monitoring system described above comprises a presence detection system to sense the presence of obstacles or bodies in space. One such presence detection system comprises LIDAR, a laser-based technology. The use of this technology allows the theft monitoring system to sense if there are any persons close to the shelves containing the items for sale. This allows searching the video for loss when there is no interaction with the self-checkout kiosk itself. Since the location of sales items on the shelf is known, comparing specific missing inventory with LiDAR data can quickly find video of theft for specific items.

In an embodiment, the theft monitoring system described above comprises a processor configured to use Phone, Bluetooth MAC Tracking Number Correlation with known transactions that are theft. Since the total number of people using a self-checkout kiosk can be relatively low compared to other retail applications, the number of people in bluetooth proximity to the self-checkout kiosk at the time of any transaction can be relatively low, and the probability that individuals often leave the bluetooth chip in their personal cell phones in an "on" state allows the system to look for correlation between identified instances of theft and particular bluetooth mac addresses. This allows quick and automatic identification of other video clips when the same bluetooth mac addresses are present to be reviewed.

In an embodiment, the theft monitoring system described above comprises a processor configured to use data triggered by load cells that sense removal of items from a shelf or cooler. The relatively slow speed of item removal allows load cell readings to be averaged over time and thus detect very small changes in weight, even for load cells supporting very heavy shelves or coolers. In addition, load cell data can be combined with the LiDAR data discussed above to further pinpoint the removal of items from shelves when no other interaction with the self-checkout kiosk is present.

A significant advantage of the theft monitoring system described above over current methods is that, in various embodiments, it can operate with very limited bandwidth relative to other video-surveillance-based loss prevention methods with the use of local OCR and data processing. By combining self-checkout screen recognition patterns with the other data the system makes available, as described herein, performing this analysis locally, then generating alerts locally, the camera meta data can be used to retrieve a very highly targeted and specific subset of all the video recorded, to be sent over low bandwidth, or relatively high cost networks such as cellular data networks for remote review. Such remote review would be impractical using video loss prevention systems not employing the above disclosed systems and methods.

In an embodiment, the theft monitoring system described above comprises a processor configured to regularly capture and store still images of the inventory of sales items on shelves for the purpose of current and historical monitoring of stock levels to improve service schedules.

The invention in accordance with an embodiment provides a self-service kiosk that includes a customer-facing display screen, a screen recorder, one or more cameras, a network, and an application server. The screen recorder is configured to capture images of the screen of the self-service kiosk. The cameras are configured to monitor an area around the self-service kiosk. The network is configured to communicate images and video captured by the screen recorder and the one or more cameras. The application server is configured to receive, store, and process the images and video captured by the screen recorded. The application server is further configured to assign each transaction a suspicion score and generate an alert when the suspicion score reaches a predetermined threshold. The system is configured to send an operator alert by various methods, such as text or email, based on previous alerts, dollar amounts, locations, identification of a repeat offender, and other factors described above.

In an embodiment, the screen recorder is connected to the video output of a pre-existing customer-supplied DVR and cameras, rather than (or in addition to) the cameras that are integral with the system.

In an embodiment, the system is configured to track theft repeat offenders, including total theft dollar amounts associated with a repeat offender's offenses. In an embodiment, a case builder function is provided to gather and store evidence associated with one or more offenses associated with a particular offender. In an embodiment, the case builder function is configured to allow self-checkout operators to add time points in the video with descriptions on buttons that can be clicked to directly jump to the point and view the action described. In an embodiment, the system is configured to provide an operator interface that includes a helpful documents section. This section allows operators to access .pdf files relevant to the case files they create, such as police reports and small claims court forms documents filtered by the state in which the operator does business.

Thus, there has been disclosed above a theft monitoring system that achieves substantial benefits over conventional theft monitoring systems, such as increased flexibility, faster analysis times, and smaller network bandwidth requirements.

At least some aspects disclosed can be embodied, at least in part, in software. That is, the techniques may be carried out in a special purpose or general purpose computer system or other data processing system in response to its processor, such as a microprocessor, executing sequences of instructions contained in a memory/data store, such as ROM, volatile RAM, non-volatile memory, cache or a remote storage device. Functions expressed in the claims may be performed by a processor in combination with memory storing code and should not be interpreted as means-plus-function limitations.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

As used herein, and especially within the claims, ordinal terms such as first and second are not intended, in and of themselves, to imply sequence, time or uniqueness, but rather are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic.

While some embodiments described above can be implemented in fully functioning computers and computer systems, various embodiments are capable of being distributed as a computing product in a variety of forms and are capable of being applied regardless of the particular type of machine or computer-readable media used to actually effect the distribution.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A theft monitoring system comprising:
   a) at least one camera;
   b) a data store including a plurality of records, each record comprising collected video footage from said at least one camera, raw transaction data from a customer-facing display screen, and metadata recordings, the raw transaction data sufficient to reconstruct a display of the customer-facing display screen; and
   c) a computer processor coupled to the data store and in communication through a network via a web interface with a video reviewer's computing device and programmed, upon receiving an indication of entry of potential purchasers, to:
      i) track suspicious behavior of a single potential purchaser, said suspicious behavior comprising transaction activities which incur a level of a numerical suspicion score other than zero;
      ii) store a first record comprising collected video footage, the raw transaction data, and the metadata recordings associated with said single potential purchaser in said data store;
      iii) determine if said suspicious behavior for multiple transaction activities for a single potential purchaser warrants evaluation;
      iv) collect the first record including the collected video footage, the raw transaction data, and the metadata associated with said single potential purchaser including grouping the collected video footage, the raw transaction data, and the metadata for each of the multiple transaction activities for the single potential purchaser into the first record; and
      v) in response to a determination that said suspicious behavior for multiple transacting activities for the single potential purchaser warrants evaluation, transmit the first record including the collected video footage, the raw transaction data, and the metadata over said network or a second network for review by an operator.

2. The theft monitoring system of claim 1, wherein said computer processor is further programmed to receive an operator referral for further review and submit the first record for a second review by an additional reviewer in response to said receipt of said operator referral.

3. The theft monitoring system of claim 2, wherein said computer processor is further programmed to create a filtered first record based on said review by said operator, and wherein the first record submitted for further review comprises the filtered first record.

4. The theft monitoring system of claim 3, wherein said computer processor is further programmed to filter the filtered first record based on said second review.

5. The theft monitoring system of claim 1, further comprising a presence detection system configured to sense presence of obstacles or bodies in space close to an area containing items for sale.

6. The theft monitoring system of claim 5, wherein said presence detection system comprises a laser-based technology.

7. The theft monitoring system of claim 6, wherein said laser-based technology comprises LIDAR.

8. The theft monitoring system of claim 1, wherein said computer processor is further programmed to search video for loss at points in said video when there is no interaction with a self-checkout kiosk.

9. The theft monitoring system of claim 1, wherein said computer processor is further programmed to use phone, Bluetooth MAC tracking number correlation with known transactions previously identified as theft to identify potential theft.

10. The theft monitoring system of claim 9, wherein said computer processor is further programmed to use said correlation to identify a repeat offender.

11. The theft monitoring system of claim 10, wherein said identification of a repeat offender comprises automatic identification of video clips in which a same bluetooth mac address is present.

12. The theft monitoring system of claim 1, wherein said computer processor is further programmed to use data triggered by load cells that sense removal of items from a shelf or cooler.

13. The theft monitoring system of claim 12, wherein said computer processor is further programmed to use said data triggered by load cells to identify a point in said video or metadata when items were removed from the shelf or cooler when no other interaction with a self-checkout kiosk is present.

14. The theft monitoring system of claim 1, wherein said computer processor is further programmed to use self-checkout screen recognition patterns with the plurality of records including screen shot, video and metadata to perform a theft analysis locally, to generate an alert locally.

15. The theft monitoring system of claim 14, wherein said computer processor is further programmed to use camera metadata to retrieve a highly targeted and specific subset of video data recorded over a low-bandwidth or relatively-high-cost network for remote review to reduce bandwidth requirements of the system.

16. The theft monitoring system of claim 15, wherein said low-bandwidth or relatively-high-cost network comprises a cellular data network.

17. The theft monitoring system of claim 1, wherein said computer processor is further programmed to send an operator alert based on one or more previous alerts, a dollar amount, a location, or identification of a repeat offender.

18. The theft monitoring system of claim 17, wherein said operator alert is sent via text or email.

19. The theft monitoring system of claim 1, wherein said computer processor is further programmed to provide a case builder function that gathers and stores evidence associated with one or more offenses associated with a particular offender.

20. The theft monitoring system of claim 19, wherein said case builder function is configured to allow said operator to mark time points in said video with descriptions.

21. The theft monitoring system of claim 20, wherein said descriptions are associated with buttons in an operator interface that can be clicked to directly jump to one of said time points and view an action described.

22. The theft monitoring system of claim 1, wherein said computer processor is further programmed to utilize facial recognition to generate an alert.

23. The theft monitoring system of claim 22, wherein said computer processor is further programmed to identify facial expressions associated with suspicious behavior.

24. The theft monitoring system of claim 22, wherein said computer processor is further programmed to add to a total suspicion score based on said facial recognition.

25. The theft monitoring system of claim 22, wherein said computer processor is further programmed to identify a user across multiple suspicious transactions based on facial recognition of the user.

26. The theft monitoring system of claim 1, wherein the system is directly integrated with a kiosk and is configured to monitor activity without recording the kiosk screen.

* * * * *